US007382792B2

(12) United States Patent
Blanc et al.

(10) Patent No.: US 7,382,792 B2
(45) Date of Patent: *Jun. 3, 2008

(54) QUEUE SCHEDULING MECHANISM IN A DATA PACKET TRANSMISSION SYSTEM

(75) Inventors: Alain Blanc, Tourrettes-sur-Loup (FR); Bernard Brezzo, Nice (FR); Rene Gallezot, La Colle-sur-Loup (FR); Francois Le Mauf, Nice (FR); Daniel Wind, Drap (FR)

(73) Assignee: International Business Machines Corporation, Armonk, NY (US)

( * ) Notice: Subject to any disclaimer, the term of this patent is extended or adjusted under 35 U.S.C. 154(b) by 927 days.

This patent is subject to a terminal disclaimer.

(21) Appl. No.: 10/065,808

(22) Filed: Nov. 21, 2002

(65) Prior Publication Data
US 2003/0099250 A1 May 29, 2003

(30) Foreign Application Priority Data
Nov. 23, 2001 (EP) .................................. 01480118

(51) Int. Cl.
*H04L 12/28* (2006.01)
(52) U.S. Cl. ........................................ 370/412; 370/414
(58) Field of Classification Search ................ 370/414, 370/412
See application file for complete search history.

(56) References Cited

U.S. PATENT DOCUMENTS 5,850,399 A * 12/1998 Ganmukhi et al. ......... 370/412
6,404,737 B1 * 6/2002 Novick et al. ............ 370/235.1
6,438,134 B1 * 8/2002 Chow et al. ................ 370/412
6,594,234 B1 * 7/2003 Chard et al. ................ 370/236
6,680,933 B1 * 1/2004 Cheesman et al. .......... 370/352
6,721,273 B1 * 4/2004 Lyon .......................... 370/235
6,839,358 B2 * 1/2005 Abiru et al. ................ 370/413
6,980,513 B2 * 12/2005 Novick ....................... 370/230
7,042,883 B2 * 5/2006 Fan et al. ................. 370/395.4
2002/0181470 A1 * 12/2002 Agnevik et al. ........ 370/395.21
2003/0118044 A1 * 6/2003 Blanc et al. ................ 370/414

* cited by examiner

*Primary Examiner*—Robert W. Wilson
(74) *Attorney, Agent, or Firm*—Anthony J. Canale

(57) ABSTRACT

A queue scheduling mechanism in a data packet transmission system, the data packet transmission system including a transmission device for transmitting data packets, a reception device for receiving the data packets, a set of queue devices respectively associated with a set of priorities each defined by a priority rank for storing each data packet transmitted by the transmission device into the queue device corresponding to its priority rank, and a queue scheduler for reading, at each packet cycle, a packet in one of the queue devices determined by a normal priority preemption algorithm. The queue scheduling mechanism includes a credit device that provides at each packet cycle a value N defining the priority rank to be considered by the queue scheduler whereby a data packet is read by the queue scheduler from the queue device corresponding to the priority N instead of the queue device determined by the normal priority preemption algorithm.

4 Claims, 2 Drawing Sheets

QUEUE SCHEDULING MECHANISM IN A DATA PACKET TRANSMISSION SYSTEM

BACKGROUND OF THE INVENTION

1. Field of the Invention

The present invention relates to a data packet transmission system wherein the data packets are transmitted from an input device to an output device through a switch engine. In particular, the present invention relates to a queue scheduling mechanism in such a data packet transmission system.

2. Background of the Invention

In today's world of telecommunications, characterized by an insatiable demand for bandwidth, there are two very fast growing technology sectors. These two technology sectors are the Internet and wireless communications. The Internet is primarily concerned with moving data while wireless communications is still mainly dealing with voice transmission. However, all of this is changing very rapidly. Service providers of all types tend to offer more services in an attempt to become, or to remain, profitable. Service offerings range from long distance transport of voice and data over high-speed data backbone to the Internet and data services being offered on wireless pieces of equipment especially wireless phones of second and third generations.

Voice has long been transported in the form of data on circuit-switched Time Division Multiplexed (TDM) networks which are very different from the Internet packet networks obeying the Internet Protocol (IP). TDM is a connection oriented network while IP is connectionless. Hence, TDM can offer the carrier-grade type of service required by delay-sensitive applications, such as voice, while IP is well adapted to the transport of data.

All specialized transport network operators want to converge to a similar "one-fits-all" type of network, i.e. a packet network able to process different flows of data depending on Quality of Service (QoS) schemes so that flows are indeed processed according to some specific requirements such as delay, jitter, bandwidth, and packet loss.

Switching and routing have been opposed due to the manner in which data packets flow through the nodes of the network. Switching is tightly associated to connection oriented protocols like ATM and requires that a path be established prior to any data movement while routing is essentially the mode of operation of IP, and its hop-by-hop moving of data packets, with a decision to be made at each node. However, the end result is that whichever access protocol is in use, the networks are in actuality becoming switched-packet networks.

When packets arrive in a node, the layer 2 forwarding component of the switching node searches a forwarding table to make a routing decision for each packet. Specifically, the forwarding component examines information contained in the packet's header, searches the forwarding table for a match, and directs the packet from the input interface to the output interface across the switch engine.

Generally, a switching node includes a plurality of output queues corresponding respectively to the plurality of output adapters and a shared memory for temporarily storing the incoming packets to be switched. The switch architecture is known to potentially provide the best possible performance allowing a full outgoing throughput utilization with no internal blocking and minimum delay.

Every queue is also organized by priority. That is, incoming packet headers, which carry a priority tag, are inspected not only to temporarily store packets in different queues, according to the output ports they are due to leave the switch engine but also are sorted by priority within each queue so that higher priority packets are guaranteed to be admitted first in the shared memory, getting precedence over lower priority traffic. In turn, the switch engine applies the same rule to the admitted packets, always privileging higher priorities. This is achieved by organizing the output queues by priority too. Hence, packet pointers, in each output queues are sorted so that admitted packets of higher priorities exit the switch engine first even though older packets, yet of a lower priority, are still waiting.

The priorities associated with the data packets are fully pre-emptive. Thus, if there are four priorities from $P_0$ to $P_3$, priority $P_0$ is going to take immediate precedence over any other traffic at priorities $P_1$-$P_3$ and so on. This is definitely a feature necessary to be able to handle a mix of voice and real-time traffic along with "pure" data traffic over a single network. This guarantees that data for the voice and real-time type of applications are handled with no delay so that there is no latency other than the necessary minimum time to traverse the switch engine and, even more importantly, in order that no significant jitter be added to any flow of real-time packets. However, this is necessarily done at the expense of lower priority traffic which has, in case of congestion, to wait. Even if this is not a problem since the transfer of data files is normally insensitive to delay and jitter, a lower priority (e.g. $P_3$) may be completely starved by higher priorities (e.g. $P_0$-$P_2$).

BRIEF SUMMARY OF THE INVENTION

Accordingly, an object of the present invention is to provide a queue scheduling mechanism which avoids a lower priority from being prevented from being transmitted by higher priorities.

Another object of the present invention is to provide a queue scheduling mechanism wherein a credit device enables a minimum bandwidth to be given to the lower priority traffic.

The present invention relates to a queue scheduling mechanism in a data packet transmission system, the data packet transmission system including a transmission device for transmitting data packets, a reception device for receiving the data packets, a set of queue devices respectively associated with a set of priorities each defined by a priority rank for storing each data packet transmitted by the transmission device into the queue device corresponding to its priority rank, and a queue scheduler for reading, at each packet cycle, a packet in one of the queue devices determined by a normal priority preemption algorithm. The queue scheduling mechanism comprises a credit device that provides at each packet cycle a value N defining the priority rank to be considered by the queue scheduler whereby a data packet is read by the queue scheduler from the queue device corresponding to the priority N instead of the queue device determined by the normal priority preemption algorithm.

BRIEF DESCRIPTION OF THE SEVERAL VIEWS OF THE DRAWINGS

The above and other objects, features and advantages of the invention will be better understood by reading the following more particular description of the present invention in conjunction with the accompanying drawings wherein.

DETAILED DESCRIPTION OF THE INVENTION

The queue scheduling mechanism according to the present invention is, in a preferred embodiment, implemented in a switch engine of a switching node wherein data packets are received from a plurality of input adapters and sent through the switch engine to another plurality of output adapters. However, such a queue scheduling mechanism could be used in any system wherein data packets received from transmitting devices are stored in queues according to several priorities before being read under the control of a queue scheduling mechanism for being sent to receiving devices.

Figure 1:
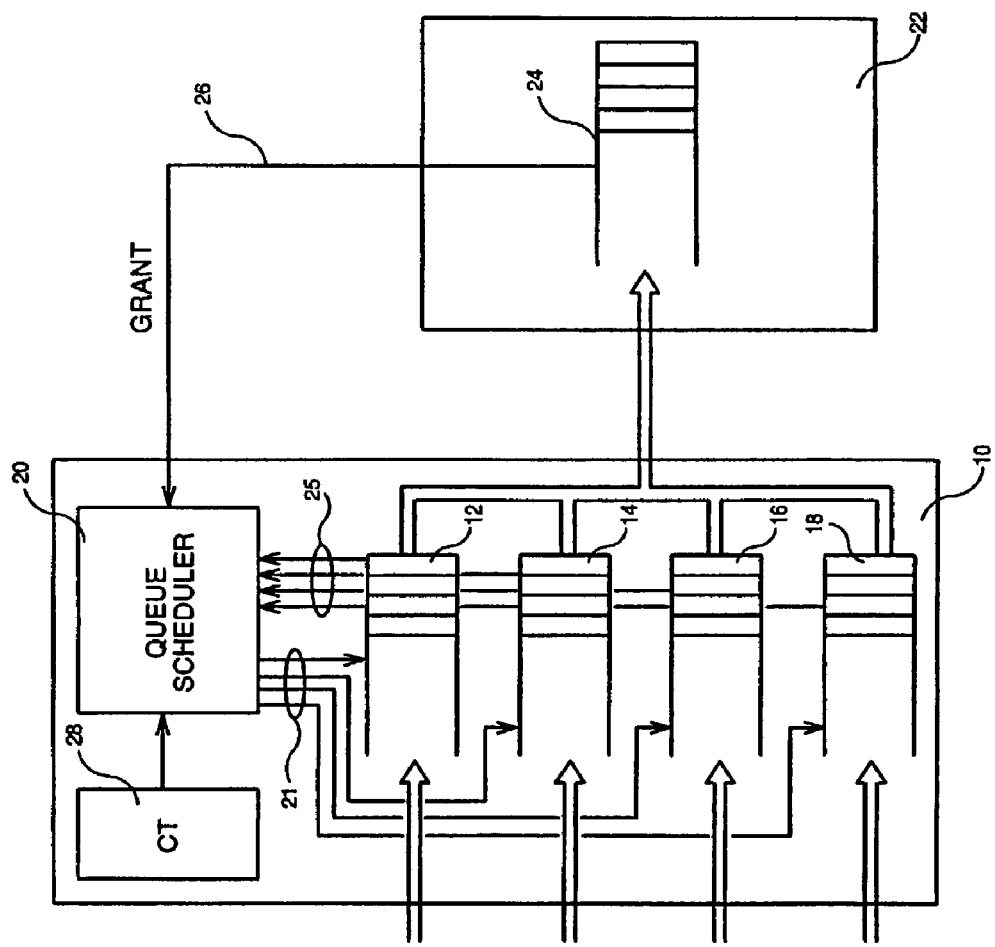
FIG. 1 illustrates a block-diagram representing a switch device wherein a queue scheduling mechanism according to the present invention is implemented.

Referring to FIG. 1, a switch engine 10 wherein the present invention is implemented, comprises several queue devices 12, 14, 16 and 18 generally organized as First-In-First-Outs (FIFOs) respectively associated with priority ranks $P_0$, $P_1$, $P_2$ and $P_3$. This means that data packets having a priority $P_0$ are stored in queue device 12, data packets of priority $P_1$ in queue device 14, data packets in priority $P_2$ in queue device 16, and data packets of priority $P_3$ in queue device 18.

At each packet cycle, the queue devices 12, 14, 16 and 18 have to be scheduled by a queue scheduler 20 through control lines 21 to allow a data packet to be read and sent to an output adapter 22 wherein the packet is stored in a queue device 24. However, a data packet may be read from a queue device of the switch engine 10 only if a GRANT signal sent on line 26 from the queue device 24 to the queue scheduler 20 is active. The activation of the GRANT signal for a given priority depends upon an algorithm which is a function of the filling level of queue device 24. Generally, there are several filling thresholds associated respectively with the priority ranks which make the GRANT signal inactive for a priority rank when the threshold associated with this priority rank is reached. Note that a packet of a priority N is read from the corresponding queue device 12, 14, 16 or 18 only if there is at least one packet stored in this queue device. The queue scheduler 20 is aware of this by means of lines 25 from the queue devices.

However, a disadvantage of the system described above is that a data packet having a low priority could stay in the switch engine for a very long time due to highest priority traffic resulting in holding a switch resource which prevents lowest priority data packets from being queued and setting a time out at the end user level followed by a retransmission of the low priority data packet which increases network congestion.

To overcome the disadvantage described above, switch engine 10 is also provided with a credit table 28 which enables to guarantee a minimum bandwidth for any priority rank. The credit table 28 is programmable and indicates which priority is allowed to be served unconditionally at each packet cycle, thus overriding the normal preemptive priority mechanism. Such a credit table can be a RAM memory having 256 locations wherein the address to be read is incremented at each packet cycle, the address returning to 0 when it reaches the value 255. For example, the credit table 28 can be organized as shown in Table 1.

| Address | Priority |
|---------|----------|
| 0 | P3 |
| 1 | P2 |
| 2 | P1 |
| . | . |
| . | . |
| 12 | P1 |
| . | . |
| . | . |
| 21 | P2 |
| 22 | P1 |
| . | . |
| . | . |
| 32 | P1 |
| . | . |
| . | . |
| 41 | P2 |
| 42 | P1 |
| . | . |
| . | . |
| 100 | P3 |
| . | . |
| . | . |

The number of locations containing each value N is defined according to a predetermined percentage of occurrences with respect to the values of the other priority ranks. In the present case, it can be seen that the priority $P_3$ is registered at addresses 0, 100 . . . , that is, $P_3$ is in one location out of one hundred locations of the credit table 28; the priority $P_2$ is registered at addresses 1, 21, 41, . . . , that is, $P_2$ is in one location out of twenty locations of the credit table 28; and, the priority $P_1$ is registered at addresses 2, 12, 22 . . . . that is, $P_1$ is in one location out of ten locations of the credit table 28. The other address locations not having a priority registered means the priority $P_0$ is registered by default since, in such a case, it is the priority $P_0$ which is served first before the other priorities.

Accordingly, the credit provided to the different priority ranks is the following in percentage:

$P_0$ 84%
$P_1$ 10%
$P_2$ 5%
$P_3$ 1%

Figure 2:
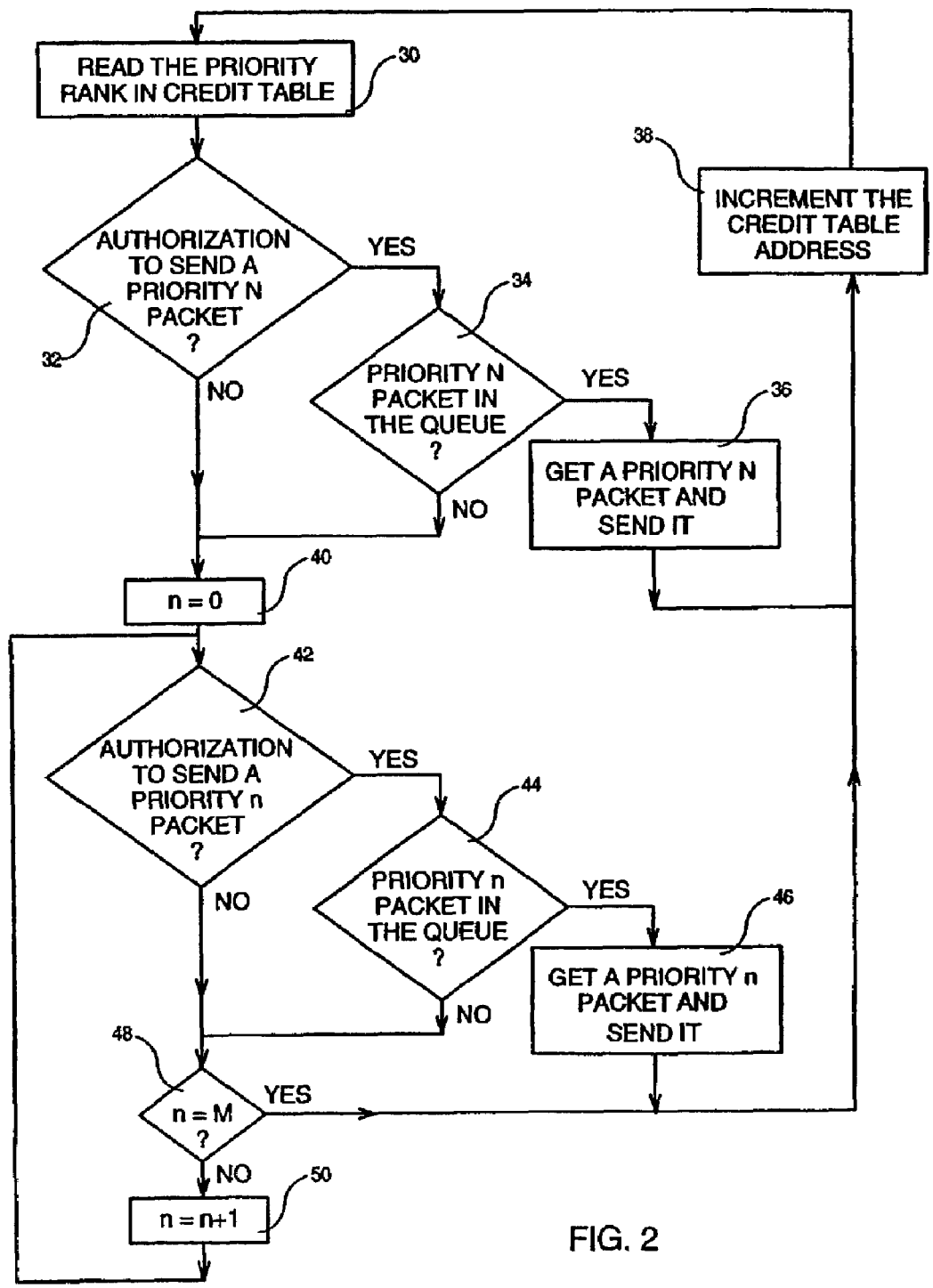
FIG. 2 illustrates a flow chart representing the steps of the method implemented in the queue scheduling mechanism according to the present invention.

The method for implementing the queue scheduling mechanism according to the invention is illustrated by the flow chart of FIG. 2. At each packet cycle, the credit table is first read (step 30) to know the priority N which is recorded at the address being read at this cycle, N being a number different from 0 as mentioned above or 0 by default. It is then checked whether the GRANT signal is active for this priority or, in other words, whether there is authorization to send a priority N packet (step 32). If so, it is determined whether there is a packet to be read in the queue corresponding to priority N (step 34). If it is the case, a priority N packet is read in the corresponding queue and sent to the output device (step 36). Then, the address of the credit table is incremented (step 38) and the process is looped back to step 30.

If the signal GRANT is not active for the priority N which has been read from the credit table or if there is no priority N packet in the corresponding queue, a variable n corresponding to the priority rank is set to 0 (step 40). It is then checked whether the GRANT signal is ON (there is authorization to send a priority n packet) for the considered priority (step 42), that is the highest priority $P_0$ with n=0. If so, it is determined whether there is a packet to be read in the queue corresponding to the priority n (step 44). If it is the case, a priority n packet is read from the queue corresponding to this priority and sent to the output device (step 46). Then, the address of the credit table is incremented (step 38) and the process is looped back to step 30.

If the signal GRANT is not active for the priority n or if there is no priority n packet in the corresponding queue, a check of whether the value of n has reached the value M corresponding to the lowest priority is performed (step 48). If so, the address of the credit table is incremented and the process is looped back to step 30. If it is not the case, variable n is incremented to n+1 (step 50) and the process returns to step 42 of processing the packet of priority n+1, and so on.

It must be noted that, if there is a credit table in the switch engine and not in the input adapter and the output adapter, there is a risk that the lower priority packets be not scheduled and stay in the adapter queue as long as there is higher priority traffic. It is therefore necessary that a credit table with the same percentage of the priority ranks (e.g. 1% for $P_3$, 5% for $P_2$ and 10% for $P_1$ as shown above) exists in the input adapter as well as in the output adapter.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

What is claimed is:

1. A method of servicing queues in a data packet transmission system, the method comprising:
    a) providing a data packet transmission system comprising a transmission device for transmitting data packets, a reception device for receiving said data packets, a set of queue devices respectively associated with a set of priorities each defined by a priority rank in a plurality of priority ranks for storing each of data packets transmitted by said transmission device into the queue device corresponding to one of said priority ranks and a single queue scheduling mechanism comprising a single queue scheduler for reading, at each packet cycle, a data packet in one of said queue devices determined by a normal priority preemption algorithm;
    b) receiving from a credit device at each packet cycle a value N defining the priority rank to be considered by said single queue scheduler, the considered priority rank is selected based on a pre-determined value related to all of said plurality of priority ranks which are associated with said single queue scheduling mechanism, wherein said priority ranks comprise high and low priority ranks;
    c) obtaining authorization to send a data packet corresponding to the priority rank N;
    d) determining whether said data packet corresponding to the priority rank N is in said queue device corresponding to the priority rank N; and,
    e) when said data packet corresponding to the priority rank N is in said queue device corresponding to the priority rank N, reading said data packet corresponding to priority rank N by said single queue scheduler from said queue device corresponding to the priority rank N instead of said queue device determined by the normal priority preemption algorithm.

2. The method of claim 1, wherein said steps (b)-(e) are repeated iteratively until a pre-determined condition is satisfied.

3. The method of claim 1, wherein when authorization to send said data packet corresponding to the priority rank N is not obtained or when said data packet corresponding to the priority rank N is not in said queue device corresponding to the priority rank N, performing a step of reading a data packet by said single queue scheduler from said queue device determined by the normal priority preemption algorithm.

4. The method of claim 1, wherein said plurality of priority ranks comprise both a highest priority rank and a lowest priority rank from among said all of said plurality of priority ranks.

* * * * *